United States Patent [19]

Waters et al.

[11] Patent Number: 5,070,706

[45] Date of Patent: Dec. 10, 1991

[54] SUPERHEAT SENSOR WITH SINGLE COUPLINGS TO FLUID LINE

[75] Inventors: Peter D. Waters, San Diego, Calif.; John M. Champagne, Seattle, Wash.

[73] Assignee: Sundstrand Corporation, Rockford, Ill.

[21] Appl. No.: 550,867

[22] Filed: Jul. 10, 1990

[51] Int. Cl.$^5$ .............................................. G01K 1/08
[52] U.S. Cl. ........................................ 62/129; 62/225; 374/143
[58] Field of Search .......................... 62/212, 225, 129; 374/28, 143, 148

[56] References Cited

U.S. PATENT DOCUMENTS

| | | | |
|---|---|---|---|
| 4,236,669 | 12/1980 | Kountz | 236/92 B |
| 4,468,968 | 9/1984 | Kee | 73/708 |
| 4,505,125 | 3/1985 | Baglione | 62/209 |
| 4,545,212 | 10/1985 | Noda | 62/129 |
| 4,571,951 | 2/1986 | Szymaszek | 62/212 |
| 4,617,804 | 10/1986 | Fukushima et al. | 62/212 |
| 4,660,387 | 4/1987 | Usami | 62/184 |
| 4,772,132 | 9/1988 | Hofmann | 374/143 |
| 4,790,145 | 12/1988 | Thompson et al. | 62/212 |

OTHER PUBLICATIONS

"A New Technology in Energy-Efficient Electrically Driven Aircraft Environmental Control Systems", authored by W. Cloud, J. McNamara and David B. Wigmore, presented at the 21st IECEC Conference, Aug. 25-29, 1986, Article #869390 American Chemical Society, pp. 1696-1702.

Primary Examiner—William E. Wayner
Attorney, Agent, or Firm—Antonelli, Terry, Stout & Kraus

[57] ABSTRACT

A superheat sensor (10, 100) for sensing the superheat of a fluid (14) flowing through a fluid channel (16) in accordance with the invention includes an aperture (18) within the fluid channel; a sensor body (20) engaging the aperture with a fluid tight seal (26) between the body and the aperture, the sensor body having a sensor body channel (44) in fluid communication with fluid flowing within the fluid channel; a pressure sensor (22) contained within the sensor body having a pressure responsive element in fluid communication with the fluid flowing through the fluid channel for producing an electrical signal representative of pressure of fluid flowing in the fluid channel; a temperature sensor (52) connected to the sensor body having at least one surface in fluid communication with the fluid flowing through the fluid channel for producing an electrical signal representation of temperature of fluid flowing in the fluid channel contacting the at least one surface; and a superheat calculator (56), responsive to the electrical signals representative of pressure and temperature, for producing, a superheat signal representative of the superheat of the fluid flowing within the fluid passage.

22 Claims, 3 Drawing Sheets

SUPERHEAT SENSOR WITH SINGLE COUPLINGS TO FLUID LINE

CROSS-REFERENCE TO RELATED APPLICATIONS

Reference is made to Patent application Ser. No. 550,544, entitled "Bearing Pump Control for Lubricating Hydrodynamic Compressor Bearings" filed on even date herewith which is assigned to the Assignee of the present invention, which application is incorporated by reference in its entirety; and to Patent application Ser. No. 550,433, entitled "Vapor Cycle Cooling System Having a Compressor Rotor Supported With Hydrodynamic Compressor Bearings", filed on even date herewith, which is assigned to the Assignee of the present application, which application is incorporated herein by reference in its entirety; and to Patent application Ser. No. 550,506, entitled "Hydrodynamic Bearing Protection System and Method", filed on even date herewith, which is assigned to the Assignee of the present invention, which application is incorporated herein by reference in its entirety; and to Patent application Ser. No. 550,458, entitled "Speed Control of a Variable Speed Aircraft Vapor Cycle Cooling System Condenser Fan and Compressor and Method of operation", filed on even date herewith, which is assigned to the Assignee of the present invention, which application is incorporated herein by reference in its entirety; and to Patent application Ser. No. 550,434, entitled "Control System For Controlling Surge As a Function of Pressure Oscillations and Method", filed on even date herewith, which is assigned to the Assignee of the present invention, which application is incorporated herein by reference in its entirety;

Patent application Ser. No. 550,432, entitled "Refrigeration System With Oiless Compressor Supported By Hydrodynamic Bearings With Multiple Operation Modes and Method of Operation", filed on even date herewith, which is assigned to the Assignee of the present invention, which application is incorporated herein by reference in its entirety; and to Patent application Ser. No. 550,631, entitled "Vapor Cycle System Evaporator control", filed on even date herewith, which is assigned to the Assignee of the present invention, which application is incorporated herein by reference in its entirety.

DESCRIPTION

Superheat Sensor With Single Coupling to Fluid Line

Technical Field

The present invention relates to sensors for sensing the superheat of a fluid. More particularly, the present invention relates to superheat sensors in which a superheat is calculated by processing of electrical signals representative of a sensed temperature and pressure of the fluid for which superheat is being calculated.

Background Art

Superheat is known as the difference between the actual temperature of a fluid and the dewpoint of the fluid. Superheat is used as a control parameter in controlling the operation of a refrigeration system and is used as a parameter in defining the operational efficiency of a refrigeration system. A high superheat at the inlet to a compressor indicates that the refrigeration system is operating inefficiently. Too low of a superheat value indicates that the refrigeration system may be subject to compressor damage resulting from the introduction of liquid refrigerant into the compressor. Accordingly, refrigeration systems are designed to maintain the superheat of the refrigeration system at the inlet to the compressor at a superheat which is high enough to avoid introducing liquid refrigerant into the compressor and low enough to not interfere with the operational efficiency of the system.

U.S. Pat. Nos. 4,505,125, 4,545,212, 4,571,951, 4,617,804 and 4,790,145 disclose electronic systems for calculating superheat in which pressure and temperature of the working fluid is measured by a temperature sensor and a pressure sensor coupled to the fluid line at separate connection points to the line. As a result, the fluid line is required to be broken twice to permit the coupling of the necessary pressure and temperature sensors to the fluid flow.

U.S. Pat. No. 4,660,387 discloses a control for an air conditioning system which mechanically detects the degree of superheating of a refrigerant for purposes of controlling the activation of a motor driving a condenser fan. The superheat detector of the '387 patent is coupled to the coolant passage containing the refrigerant for which superheat is being measured by a single coupling point. However, the pressure sensor functions in response to the difference in pressure between a pressure responsive chamber and a temperature responsive chamber contained in the pressure responsive chamber. The combined effects of the refrigerant coupled to the pressure responsive chamber containing the temperature responsive chamber and the change in temperature upon the temperature responsive chamber move a rod connected to the temperature responsive chamber to activate a differential transformer which controls the activation of the motor driving the condenser fan. The detector disclosed in the '387 patent is complicated and suffers from inaccuracies when compared with the accuracies obtainable with electrical sensors. Furthermore, calibration of a system using mechanical sensors of pressure and temperature to generate superheat can be difficult and the temperature sensing structures can be fragile and subject to breakage.

U.S. Pat. No. 4,236,669 discloses a thermostatic expansion valve with lead-lag compensation. The lead-lag compensation is connected to a pressure responsive device to allow rapid movement of a valve member upon the occurrence of either a sudden change in temperature of the refrigerant at the outlet of an evaporator or in the pressure at the inlet of the evaporator so as to provide a constant superheat.

DISCLOSURE OF INVENTION

The present invention is an improved superheat calculator which requires only a single coupling to a fluid channel carrying a fluid for which superheat is being measured and which provides a highly accurate calculation of superheat as a consequence of the temperature and pressure of the fluid being measured by electrical sensors and the calculation of superheat being performed by electrical signal processing. The accuracy that is consequent from using electrical sensors permits a highly accurate calculation of superheat to be made which facilitates the precise control of a system in which superheat is a parameter used for controlling system operation, such as in refrigeration systems. With the invention, the installation of a superheat calculator is simplified as a consequence of a single coupling required to the fluid channel carrying the fluid for which superheat is being measured. Furthermore, the present invention provides an economical superheat calculator where precision control of a system as a function of superheat is required as a consequence of providing an electrical signal representative of the superheat with high accuracy which may be used in a digital control system for the refrigeration system.

A superheat sensor for sensing the superheat of a fluid flowing through a fluid channel in accordance with the invention includes an aperture within the fluid channel; a sensor body engaging the aperture with a fluid tight seal between the body and the aperture, the sensor body having a sensor body channel in fluid communication with fluid flowing within the fluid channel; a pressure sensor contained within the sensor body within a first bore having a pressure responsive element in fluid communication with the fluid within the sensor body channel for producing an electrical signal on a pressure sensor output representative of pressure of fluid flowing in the fluid channel; a temperature sensor connected to the sensor within a second bore body having at least one surface in fluid communication with the fluid flowing through the fluid channel for producing an electrical signal on a temperature sensor output representative of temperature of fluid flowing in the fluid channel contacting the at least one surface a second joined to the sensor body with a fluid tight seal, the section closing the first and second bores at an opening of the bores facing the section, the sensor outputs extending through the section; another section attached to the section; and a superheat calculator, responsive to the electrical signals representative of pressure and temperature and attached to the another section, for producing a superheat signal representative of the superheat of fluid flowing within the fluid passage. The pressure sensor may be a semiconductor pressure sensor and the temperature sensor may be a thermistor. The temperature sensor projects from the sensor body into the fluid channel. The pressure sensor is within a first bore in the sensor body and the temperature sensor is within a second bore in the sensor body. The pressure responsive element is a pressure transducing material which is retained by a retainer which is joined to the first bore.

The superheat calculation circuit includes a dewpoint temperature calculator, responsive to the electrical signal representative of fluid pressure, for calculating a dewpoint temperature of the fluid flowing in the fluid passage as a function of the sensed fluid pressure; a summer, responsive to the calculated dewpoint temperature and a temperature of the fluid within the fluid passage, for calculating a superheat of the fluid flowing in the fluid passage by computing a difference between the calculated dewpoint temperature and the temperature of the fluid within the fluid passage. The fluid may be a non-azeotropic binary refrigerant. The dewpoint calculator is programmable to calculate a dewpoint temperature for different types of fluid flowing in the fluid passage. The dewpoint temperature calculator is programmable to calculate a dewpoint temperature for relative amounts of two individual refrigerants which comprise the non-azeotropic binary refrigerant.

The invention further includes a lead-lag compensator, coupled to the output of the temperature sensor and to the summer, for amplifying the electrical signal representative of fluid temperature with a gain which increases as a function of frequency of the signal representative of fluid temperature.

The pressure sensor may be disposed with one side in fluid communication either substantially orthogonal to the flow of fluid through the fluid channel to produce an electrical signal representative of static and dynamic pressure of the fluid flow through the fluid channel or substantially parallel to the flow of fluid flow through the fluid channel to produce an electrical signal representative of the static pressure of the fluid flow through the fluid channel.

BEST MODE FOR CARRYING OUT THE INVENTION

Figure 1:
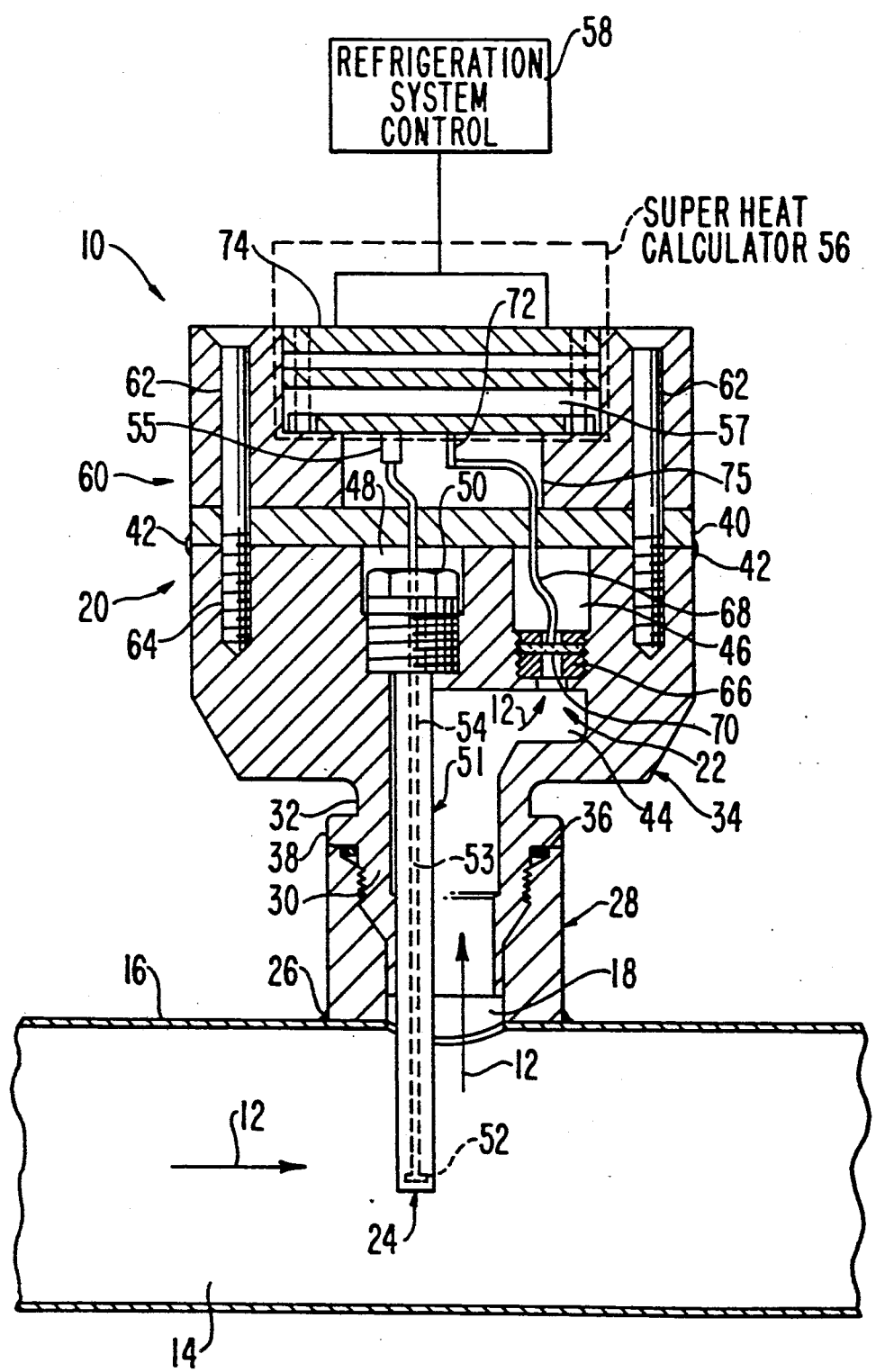
FIG. 1 illustrates a first embodiment of a superheat sensor in accordance with the present invention.

FIG. 1 illustrates a first embodiment 10 of a superheat sensor in accordance with the present invention. The superheat sensor 10 functions to sense the superheat of a fluid 12 flowing through a fluid channel 14 which may be defined by a conduit 16 contained in a refrigeration system. While the invention is not limited thereto, a preferred application of the invention is in a refrigeration system having a non-azeotropic binary refrigerant used for cooling in an airframe. The invention is an improvement over the prior art in that only a single aperture 18 is required to couple a sensor body 20 carrying an electrical pressure sensor 22 and a temperature sensor 24 to a fluid 12 for which superheat is being measured. The invention is unlike the prior art electrical superheat calculating systems in which electrical sensors are coupled to the fluid carrying line for which superheat is measured at separate locations in the fluid carrying line which complicates the installation and furthermore could result in leakage of fluid. The sensor body 20 is a metallic fitting having a weld 26 which forms a fluid tight seal with the sidewall 16 of the conduit 14.

The sensor body fitting is comprised of four main parts. The first section is a boss 28 which is welded to the conduit wall 16 by the aforementioned weld 26. The boss may be in accordance with M.S. 33649. The boss 28 has interior threads 30 which engage the stem 32 of a first section 34. The tapered stem and corresponding tapered structure of the boss may be in accordance with M.S. 33656. O-ring 36 provides a seal between the boss 28 and the stem 32. Nut 38 holds the O-ring 36 in place. A second section 40 is attached to the first section by a weld 42 to provide a fluid tight seal with the periphery of the first section 34. The sensor body channel 44 is bifurcated into two bores 46 and 48 which respectively are threaded to engage the pressure sensor 22 and the temperature sensor 24. The temperature sensor 24 is comprised of an upper portion 50 which may be similar to MS 90725 and a lower housing 51 having a chamber 53 retaining a temperature sensing element 52 which may be a thermistor which has at least one surface in fluid communication with the fluid 12. One or more apertures (not illustrated) may be contained in the sidewall or bottom of the lower housing 51 to provide direct fluid communication from the fluid 12 to the temperature sensing element 52 of the temperature sensor 24. Wires 54 couple the temperature sensing element 52 to a post 55 within bore 75 to which circuit connections are made to a superheat calculator 56 comprised of one or more circuit boards 57 which calculate superheat which is applied to a refrigeration system control 58 as a control parameter for modulating an expansion valve to provide control of the refrigeration system in a convention manner. A third section 60 is connected to the second section 40 by fasteners 62 which have threads engaging threads within bores 64 of the first section 34. The pressure sensor 22 is threaded to engage threads within the bore 46 and the upper portion 50 engages threads in the first section. A commercially available pressure sensor 22 includes a conventional piezoelectric semiconductor material 70 retained by retainer 66 which may be held in place by epoxy or another suitable sealant. Similarly, the bolt 50 may be retained in the bore 48 by epoxy or another suitable sealant engaging the threads of the bore. Leads 68 couple the pressure sensor material 70 to post 72 within bore 75 which is electrically connected to the circuit boards 74 which comprise the superheat calculator 56 by electrical connections (not illustrated). A hermetic seal (not illustrated) prevents leakage of any fluid which flows from the channel 14 into the bores 46 and 48. Only one side of the pressure sensing material 70 is in fluid communication with the fluid 12. As illustrated, the pressure sensor 22 is primarily responsive to static pressure within the channel 14 as a consequence of the fluid flow 12 being substantially parallel to the opening of the aperture 18. The embodiment of FIG. 1 is preferably applied to measuring superheat in which the velocity of the fluid 12 is not high as a consequence of the flow of fluid 12 into the sensor body channel 44 being orthogonal to the primary direction of fluid flow in the fluid channel 14. The temperature sensor 24 extends into the fluid channel 14 so as to provide a rapid response to a change in temperature of the fluid flowing through the fluid channel contacting the temperature sensor to provide a superheat calculation not having appreciable lag time which facilitates the control of a refrigeration system to provide a dynamic response to changing conditions of the refrigerant, such as changing the opening of an expansion valve as a function of the calculated superheat.

Figure 2:
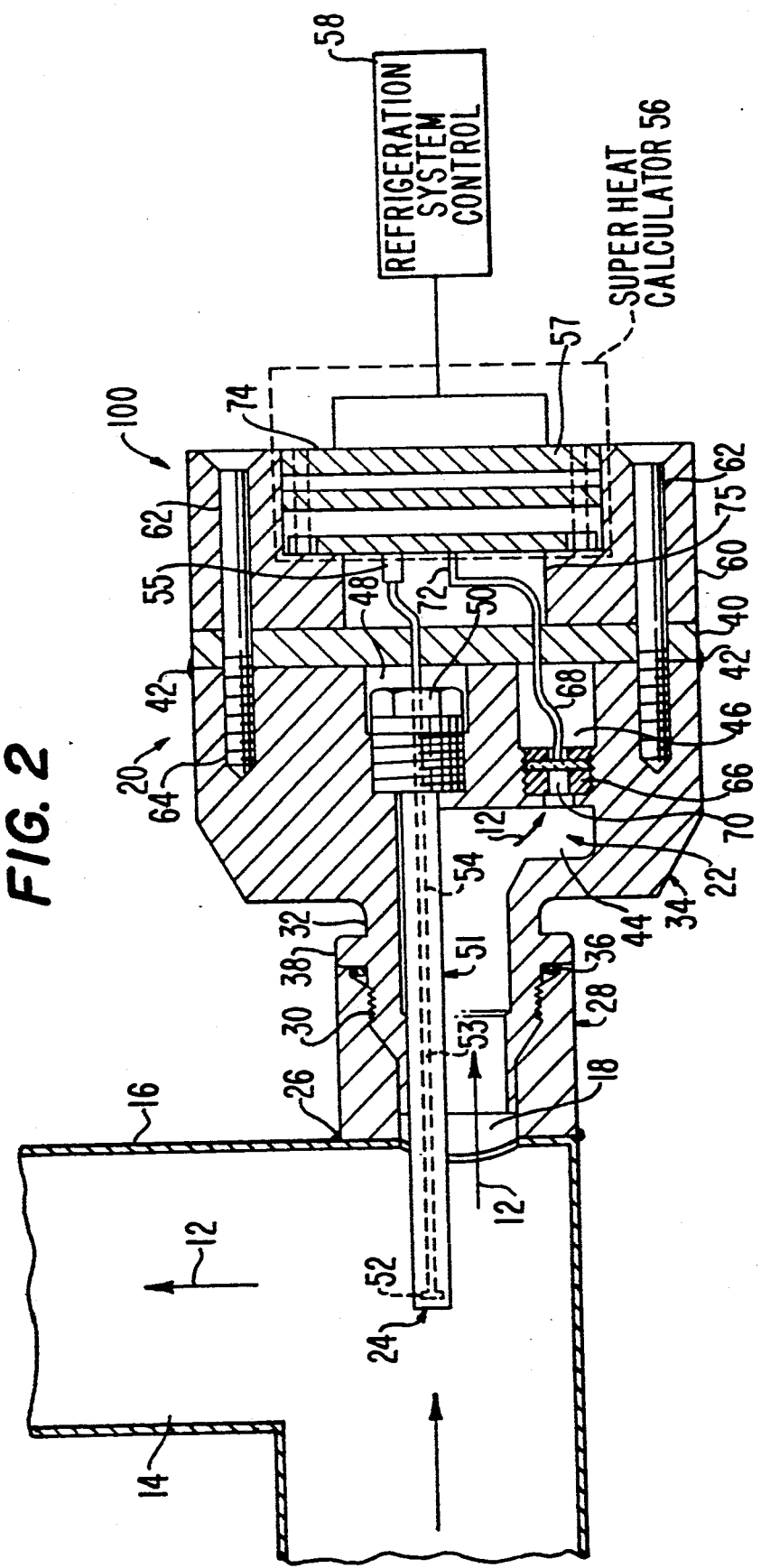
FIG. 2 illustrates a second embodiment of a superheat sensor in accordance with the present invention.

FIG. 2 illustrates a second embodiment 100 of a superheat sensor in accordance with the present invention. Like reference numerals identify like parts in FIGS. 1 and 2. The only difference between the embodiment 100 of FIG. 2 and the embodiment 10 of FIG. 1 is the physical orientation of the superheat sensor which results in the embodiment of FIG. 2 being responsive to static and dynamic pressure variations within the fluid stream 12. The one side of the pressure sensor material 70 in fluid communication with the fluid flow 12 is substantially orthogonal to the direction of fluid flow 12 in the channel 14 which results in the pressure sensor being responsive to both static and dynamic pressure which improves the accuracy of the superheat calculation when the pressure of the refrigerant has a substantial component of dynamic pressure.

Figure 3:
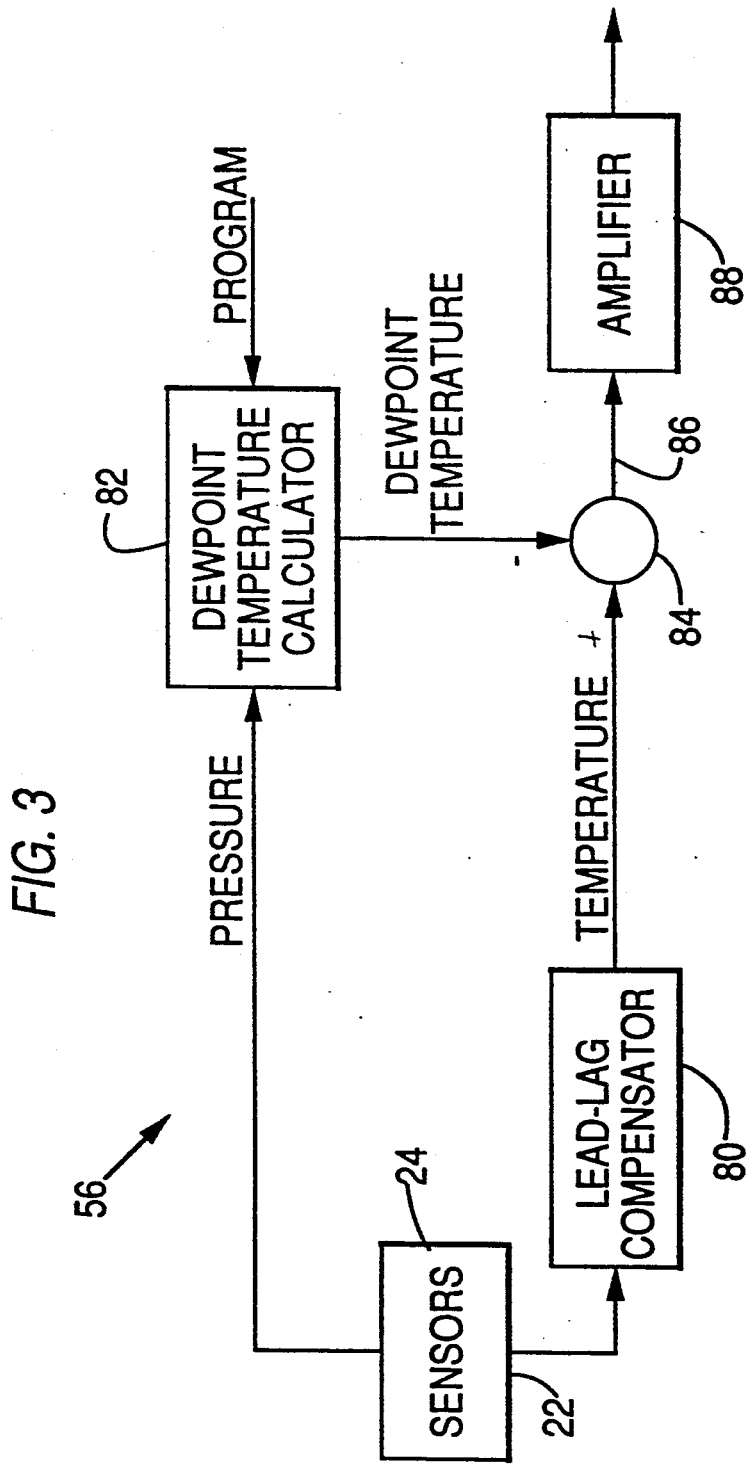
FIG. 3 illustrates the electrical processing circuitry for converting the sensed pressure and temperature produced by the sensor of FIGS. 1 and 2 into a signal representative of superheat.

FIG. 3 illustrates an implementation of the superheat calculator 56 of FIGS. 1 and 2. Like reference numerals identify like parts in FIGS. 1-3. The pressure sensor 22 and temperature sensor 24 respectively produce output signals identified by "pressure" and "temperature" in FIG. 3. A lead-lag electrical compensator 80 is coupled to the output of the temperature sensor and to a summer 82 for amplifying the electrical signal representative of fluid temperature outputted by the temperature sensor 24 with a gain which increases linearly as a function of frequency of the signal representative of fluid temperature. Circuitry for implementing the lead-lag compensator 80 is known and may be in accordance with any conventional design. The lead-lag compensator 80 compensates for the inherent lag in temperature sensor 24 which has a lower frequency response than the pressure sensor 22. The lead-lag compensator 80 eliminates the difference in response time of the temperature and pressure sensors. The "pressure" signal, representative of the pressure of the fluid, is applied to a dewpoint temperature calculator 82 which is programmable to calculate a dewpoint temperature for different types of fluid flowing in the fluid passage 14, such as refrigerants. Furthermore, the dewpoint temperature calculator 82 is programmable to calculate a dewpoint temperature for relative amounts of two individual refrigerants which may comprise a non-azeotropic binary refrigerant. A programmable dewpoint calculator, which may be utilized in implementing the dewpoint temperature calculator 82, is disclosed in application Ser. No. 503,753, entitled "A Refrigerant Superheat Calculation Device" filed on Apr. 3, 1990, which is assigned to the Assignee of the present invention, which is incorporated herein by reference in its entirety. The dewpoint temperature calculated by the dewpoint temperature calculator 82 is subtracted from the compensated temperature outputted by the lead-lag compensator 80 by summer 84 to produce the superheat on output 86 which, as described above, is equal to the difference between the actual temperature of the fluid flowing in the channel 14 and the calculated dewpoint temperature. The superheat 86 is applied to amplifier 88 which outputs a control signal used by the refrigeration system control 58 described above with respect to FIGS. 1 and 2, such as controlling of an expansion valve to control the temperature of the refrigerant flowing into a compressor. The amplifier 88 may convert the signal from analog form to digital form if the output of the summer 84 is analog or may convert the superheat from digital to analog if the output of the summer is digital.

In order to provide a tight seal between the second section 40 and the third section 60, posts like posts 55 and 72 may be imbedded in a bottom portion of the second section and top portion of the second section with the posts being electrically connected. The wires 54 and 68 would be cut in two sections with the bottom sections attached to the posts in the bottom portion of the second section 40 and the top sections attached to the posts in the top portion of the second section. Additionally, the bottom part of the pressure sensor may be machined from the material from which the first section 28 is formed.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A superheat sensor for sensing the superheat of a fluid flowing through a fluid channel comprising:
   an aperture within the fluid channel
   a sensor body engaging the aperture with a fluid tight seal between the body and the aperture, the sensor body having a sensor body channel in fluid communication with fluid flowing within the fluid channel;
a pressure sensor contained within the sensor body within a first bore having a pressure responsive element in fluid communication with the fluid within the sensor body channel for producing an electrical signal on a pressure sensor output representative of pressure of fluid flowing in the fluid channel;
a temperature sensor connected to the sensor body within a second bore having at least one surface in fluid communication with the fluid flowing through the fluid channel for producing an electrical signal on a temperature sensor output representative of temperature of fluid flowing in the fluid channel contacting the at least one surface;
a section joined to the sensor body with a fluid tight seal, the section closing the first and second bores at an opening of the faces facing the section, the sensor outputs extending through the section;
another section attached to the section; and
a superheat calculator, responsive to the electrical signals representative of pressure and temperature and attached to the another section, for producing a superheat signal representative of the superheat of fluid flowing within the fluid passage.

2. A superheat sensor in accordance with claim 1 wherein:
the pressure sensor is a semiconductor pressure sensor and the temperature sensor is a thermistor.

3. A superheat sensor in accordance with claim 2 wherein the superheat calculator comprises:
a dew point temperature calculator, responsive to the electrical signal representative of fluid pressure, for calculating a dew point temperature of the fluid flowing in the fluid passage as a function of sensed fluid pressure; and
a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

4. A superheat sensor in accordance with claim 2 wherein:
the temperature sensor projects from the sensor body into the fluid channel.

5. A superheat sensor in accordance with claim 4 wherein:
the pressure responsive element is a pressure transducing material which is retained by retainer which is joined to the first bore.

6. A superheat sensor in accordance with claim 5 wherein the superheat calculator comprises:
a dew point temperature calculator, responsive to the electrical signal representative of fluid pressure, for calculating a dew point temperature of the fluid flowing in the fluid passage as a function of sensed fluid pressure; and
a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

7. A superheat sensor in accordance with claim 4 wherein the superheat calculator comprises:
a dew point temperature calculator, responsive to the electrical signal representative of fluid pressure, for calculating a dew point temperature of the fluid flowing in the fluid passage as a function of sensed fluid pressure; and
a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

8. A superheat sensor in accordance with claim 2 wherein:
the pressure responsive element is a pressure transducing material which is retained by retainer which is joined to the first bore.

9. A superheat sensor in accordance with claim 8 wherein the superheat calculator comprises:
a dew point temperature calculator, responsive to the electrical signal representative of fluid pressure, for calculating a dew point temperature of the fluid flowing in the fluid passage as a function of sensed fluid pressure; and
a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

10. A superheat sensor in accordance with claim 1 wherein:
the temperature sensor projects from the sensor body into the fluid channel.

11. A superheat sensor in accordance with claim 10 wherein:
the pressure responsive element is a pressure transducing material which is retained by retainer which is joined to the first bore.

12. A superheat sensor in accordance with claim 11 wherein the superheat calculator comprises:
a dew point temperature calculator, responsive to the electrical signal representative of fluid pressure, for calculating a dew point temperature of the fluid flowing in the fluid passage as a function of sensed fluid pressure; and
a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

13. A superheat sensor in accordance with claim 10 wherein the superheat calculator comprises:
   a dew point temperature calculator, responsive to the electrical signal representative of fluid pressure, for calculating a dew point temperature of the fluid flowing in the fluid passage as a function of sensed fluid pressure; and
   a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

14. A superheat sensor in accordance with claim 1 wherein:
   the pressure responsive element is a pressure transducing material which is retained by retainer which is joined to the first bore.

15. A superheat sensor in accordance with claim 14 wherein the superheat calculator comprises:
   a dew point temperature calculator, responsive to the electrical signal representative of fluid pressure, for calculating a dew point temperature of the fluid flowing in the fluid passage as a function of sensed fluid pressure; and
   a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

16. A superheat sensor in accordance with claim 1 wherein the superheat calculator comprises:
   a dew point temperature calculator, responsive to the electrical signal representative of fluid pressure, for calculating a dew point temperature of the fluid flowing in the fluid passage as a function of sensed fluid pressure; and
   a summer, responsive to the calculated dew point temperature and a temperature of the fluid within the fluid passage which has been amplified by a lead-lag compensator with a gain which increases linearly as a function of frequency of the signal representative of temperature to provide a compensated temperature, for calculating a superheat of the fluid flowing in the fluid passage by computing a difference between the calculated dew point temperature and the compensated temperature of the fluid within the fluid passage.

17. A superheat sensor in accordance with claim 16 wherein:
   the dew point temperature calculator is programmable to calculate a dewpoint temperature for different types of fluid flowing in the fluid passage.

18. A superheat sensor in accordance with claim 16 wherein:
   the dew point temperature calculator is programmable to calculate a dew point temperature for relative amounts of two individual refrigerants which comprise a non-azeotropic binary refrigerant.

19. A superheat sensor in accordance with claim 1 wherein:
   the fluid is a non-azeotropic binary refrigerant.

20. A superheat sensor in accordance with claim 1 further comprising:
   a lead-lag compensator, coupled to an output of the temperature sensor and to the summer, for amplifying the electrical signal representative of fluid temperature with a gain which increases linearly as a function of frequency of the signal representative of fluid temperature.

21. A superheat sensor in accordance with claim 1 wherein:
   one side of a pressure sensing material of the pressure sensor in fluid communication with the fluid in the fluid channel is disposed substantially orthogonal to the flow of fluid through the fluid channel to produce an electrical signal representative of static and dynamic pressure of the fluid flow through the fluid channel.

22. A superheat sensor in accordance with claim 1 wherein:
   one side of a pressure sensing material of the pressure sensor in fluid communication with the fluid in the fluid channel is disposed substantially parallel to the flow of fluid through the fluid channel to produce an electrical signal representative of the static pressure of the fluid flow through the fluid channel.

* * * * *